(12) United States Patent
Lou et al.

(10) Patent No.: US 8,416,189 B2
(45) Date of Patent: Apr. 9, 2013

(54) MANUAL HUMAN MACHINE INTERFACE OPERATION SYSTEM AND METHOD THEREOF

(75) Inventors: Chung-Cheng Lou, Taipei (TW); Jing-Wei Wang, Los Angeles, CA (US)

(73) Assignee: Acer Incorporated, Hsichih, Taipei County (TW)

( * ) Notice: Subject to any disclaimer, the term of this patent is extended or adjusted under 35 U.S.C. 154(b) by 316 days.

(21) Appl. No.: 12/793,702

(22) Filed: Jun. 4, 2010

(65) Prior Publication Data

US 2011/0298698 A1 Dec. 8, 2011

(51) Int. Cl.
*G06F 3/0346* (2006.01)
(52) U.S. Cl. .................. 345/158; 463/32; 715/863
(58) Field of Classification Search .......... 345/156–184; 463/30–34; 715/863; 702/150–173
See application file for complete search history.

(56) References Cited

U.S. PATENT DOCUMENTS

| | | | |
|---|---|---|---|
| 2007/0283296 A1* | 12/2007 | Nilsson | 715/863 |
| 2009/0217211 A1* | 8/2009 | Hildreth et al. | 715/863 |
| 2009/0322676 A1* | 12/2009 | Kerr et al. | 345/158 |
| 2009/0324014 A1* | 12/2009 | Kato et al. | 382/103 |
| 2011/0173574 A1* | 7/2011 | Clavin et al. | 715/863 |
| 2011/0237324 A1* | 9/2011 | Clavin et al. | 463/29 |
| 2011/0289456 A1* | 11/2011 | Reville et al. | 715/830 |
| 2011/0310007 A1* | 12/2011 | Margolis et al. | 345/157 |

\* cited by examiner

*Primary Examiner* — Liliana Cerullo
(74) *Attorney, Agent, or Firm* — McClure, Qualey & Rodack, LLP

(57) ABSTRACT

A manual human machine interface operation system and method thereof are disclosed. In embodiment, this manual human machine interface operation system extracts user's arm image and palm image from the images capture by at least two cameras, and then calculates user's arm coordinate, so that user can select the object shown on the human machine interface by manually using his/her arm. The system then recognizes a hand posture according to the palm image and determines an instruction mapped to this hand posture. This instruction is then performed on the selected object. In embodiment, the hand posture can be a pointing posture, grab posture or a release posture.

10 Claims, 5 Drawing Sheets

MANUAL HUMAN MACHINE INTERFACE OPERATION SYSTEM AND METHOD THEREOF

TECHNICAL FIELD

The present invention relates generally to a manual human machine interface operation system, more particularly, related to an interface operation technology of allowing user to operate a manual human machine interface with object having depth parameter by using his/her arm and palm.

BACKGROUND

Three-dimensional human machine interface design is a critical component of any virtual environment (VE) application. Different from normal 2D user interface, the 3D user interface is more close to human intuition. However, people often find it inherently difficult to understand 3-D spaces and to perform actions in free space. Although we live and act in a 3-D world, the physical world contains many more cues for understanding and constraints and affordances for action that cannot currently be represented accurately in a computer simulation. Conventional human machine interface operation is performed by using keyboard, mouse, touch panel and remote controller. However, these four operation schemes have some disadvantages: it is convenient to use keyboard for data typing, but not for visual object control; the user must hold a device for operation while using a mouse or a remote controller; while operating the touch panel, the user is limited in a space where his/her finger can reach the touch panel.

SUMMARY OF THE INVENTION

Therefore, an object of the present invention is to provide a manual human machine interface operation system and method thereof, for improving interface operation convenience.

The object of the present invention can be achieved by providing a manual human machine interface operation system which comprises a display unit, a data processing unit, multiple image capture units, an image analysis unit, a coordinate calculation unit and a hand posture recognition unit. The data processing unit is capable of generating a human machine interface with multiple objects and controlling the display unit to display the human machine interface. Each object contains a depth parameter. The image capture units are capable of capturing multiple hand images, and each image capture unit has multiple intrinsic parameters and multiple extrinsic parameters. The image analysis unit is capable of analyzing the multiple hand images to obtain multiple arm images and multiple palm images. The coordinate calculation unit, according to the arm images and intrinsic parameters and extrinsic parameters of each of image capture units, calculates arm feature points, and calculates an arm extension line and an arm movement according to the arm feature points. The hand posture recognition unit is capable of recognizing a hand posture according to the palm images. The data processing unit is operable to, according to the arm extension line, the arm movement and the depth parameters of objects, determine a selected object from the objects, and determine an instruction corresponding to the hand posture, and perform the instruction on the selected object.

Preferably, the data processing unit performs a selecting instruction while the hand posture is recognized as a pointing posture by the hand posture recognition unit.

Preferably, the data processing unit performs a grab instruction to set the selected object into a grabbed status and move the selected object according to the arm movement while the hand posture is recognized as a grab posture by the hand posture recognition unit.

Preferably, the data processing unit performs a release instruction to erase the grabbed status of the selected object while the hand posture is recognized as a release posture by the hand posture recognition unit.

Preferably, the data processing unit calculates an arm length according to the arm feature points, and determines an object display depth according to a ratio of the length and the arm movement, and determines the selected object according to the object display depth.

Preferably, the selected object is highlighted on the human machine interface.

The object of the present invention can be achieved by providing a method of operating a manual human machine interface with multiple objects, and each object contains a depth parameter. The method comprising steps of using multiple image capture units to capture multiple hand images, wherein each image capture unit has multiple intrinsic parameters and multiple extrinsic parameters; analyzing the multiple hand images to obtain multiple arm images and multiple palm images; according to the arm images and intrinsic parameters and extrinsic parameters of each of image capture units, calculating arm feature points, and calculating an arm extension line and an arm movement according to the arm feature points; according to the arm extension line, the arm movement and the depth parameters of the objects, determine a selected object from the objects; recognizing a hand posture according to the palm images; determining an instruction corresponding to the hand posture and performing the instruction on the selected object.

Preferably, the method further comprises a step of performing a selecting instruction while the hand posture is recognized as a pointing posture.

Preferably, the method further comprises a step of performing a grab instruction to set the selected object into a grabbed status and move the selected object according to the arm movement while the hand posture is recognized as a grab posture.

Preferably, the method further comprises a step of performing a release instruction to erase the grabbed status of the selected object while the hand posture is recognized as a release posture.

Preferably, the method further comprises steps of calculating an arm length according to the arm feature points, and determining an object display depth according to a ratio of the arm length and the arm movement; and determining the selected object according to the object display depth.

Preferably, the method further comprises steps of highlighting the selected object on the human machine interface.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
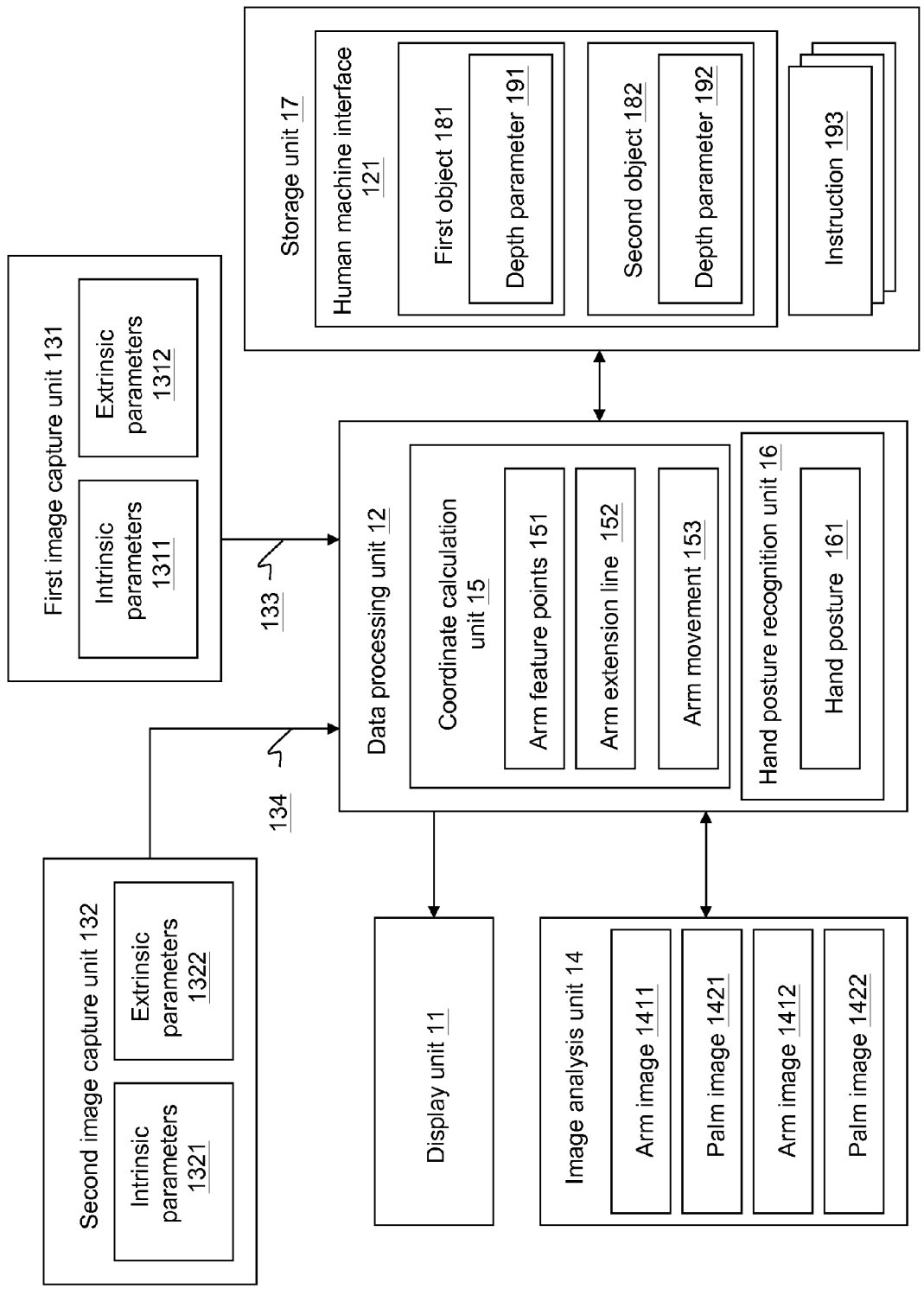
FIG. 1 illustrates an exemplary block diagram of manual human machine interface operation system in accordance with the present invention.
Figure 2:
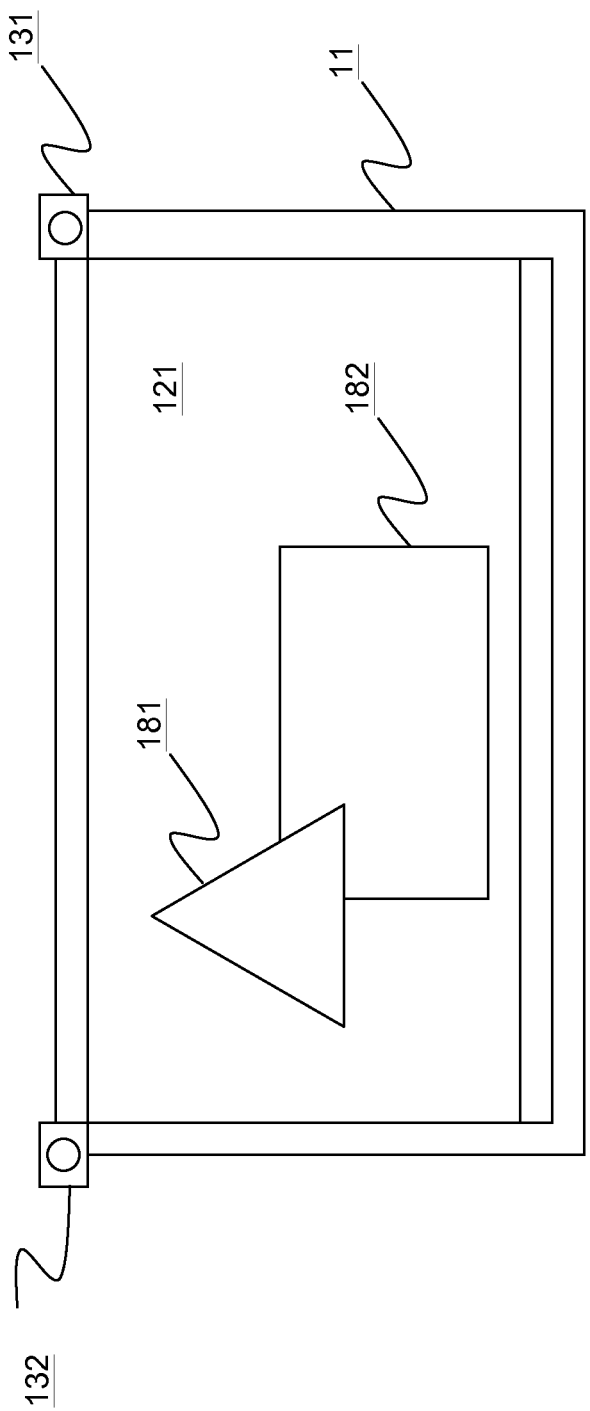
FIG. 2 illustrates a schematic view of embodiment of manual human machine interface operation system in accordance with the present invention.
Figure 3:
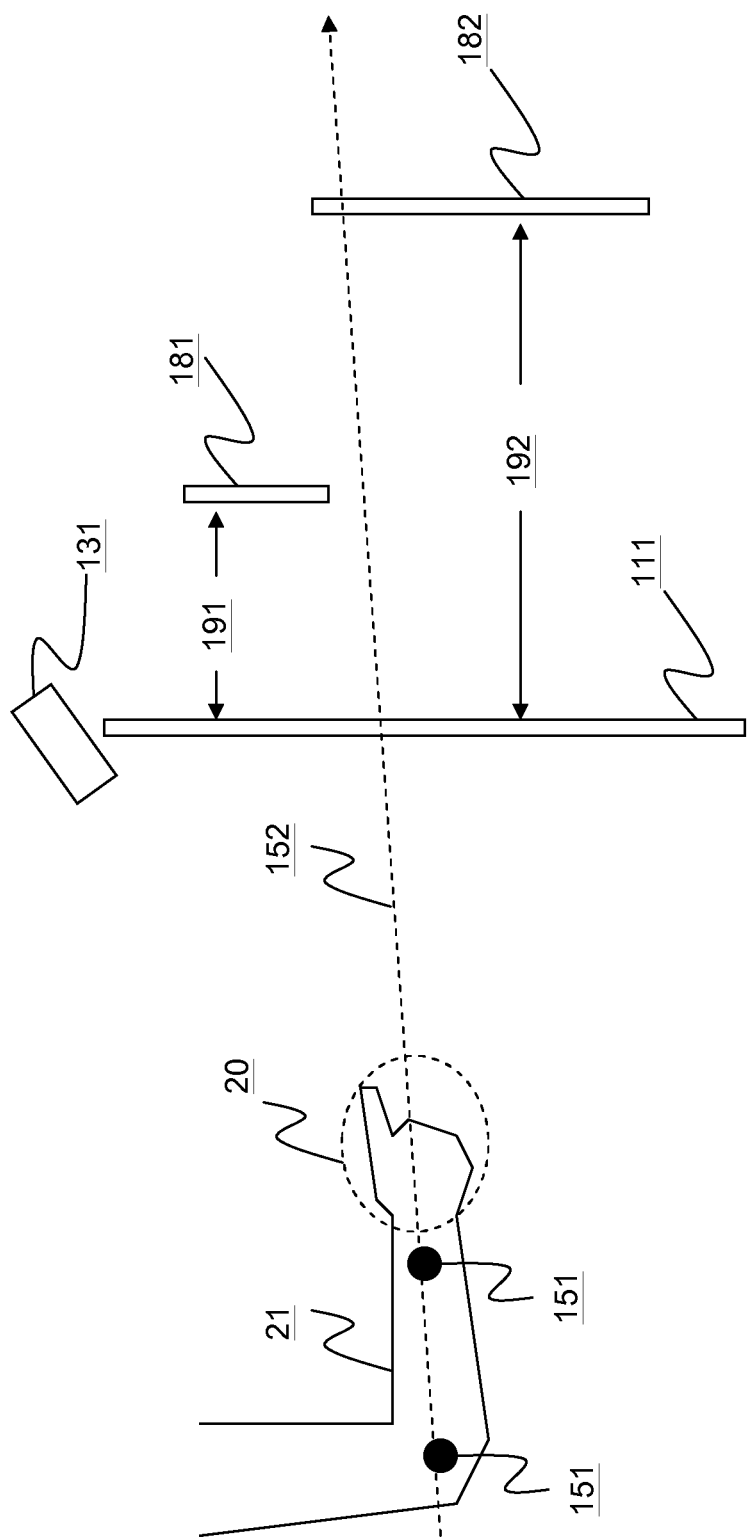
FIG. 3 illustrates a side virtual view of embodiment of the human machine interface displayed on the display unit.

FIG. 1 illustrates an exemplary block diagram of manual human machine interface operation system in accordance with the present invention. The manual human machine interface operation system comprises a display unit 11, a data processing unit 12, a first image capture unit 131, a second image capture unit 132, an image analysis unit 14, a coordinate calculation unit 15, a hand posture recognition unit 16 and a storage unit 17. The storage unit 17 stores a program of a human machine interface 121 which at least comprises a first object 181 and a second object 182. The data processing unit 12 accesses the program of a human machine interface 121, and executes the program to generate a visual content of the human machine interface 121, and controls the display unit 11 to display such visual content. The first object 181 has a depth parameter 191, and the second object 182 has a depth parameter 192. The depth parameter 191 and the depth parameter 192 are used to define the displaying depth of the first object 181 and the second object 182. FIG. 2 illustrates a schematic view of embodiment of manual human machine interface operation system in accordance with the present invention. FIG. 3 illustrates a side virtual view of embodiment of the human machine interface displayed on the display unit. When the depth parameter 192 is larger than the depth parameter 191, the first object 181 overlaps on the second object 182 in the human machine interface 121, as shown in the FIG. 2. The virtually location relationship among the surface 111 of the display unit 11, the first object 181 and the second object 182 is shown in FIG. 3.

The first image capture unit 131 and the second image capture unit 132 are used to respectively capture the user's hand image 133 and hand image 134. Preferably, the first image capture unit 131 and the second image capture unit 132 are arranged at the edge of the display unit 11 for better capturing hand image because user usually performs operation in the front of the display unit 11. After being arranged, the first image capture unit 131 and the second image capture unit 132 must be calibrated for calculating the transformation between the pixel position in the captured image and the coordinate of the display unit 11. After calibration, multiple intrinsic parameters 1311 and extrinsic parameters 1312 for the first image capture unit 131 can be obtained, and multiple intrinsic parameters 1321 and extrinsic parameters 1322 for the second image capture unit 132 can be obtained. Preferably, intrinsic parameters comprise physical parameters of the image capture unit, such as the focus lens and the size of image; and the extrinsic parameters comprise the coordinate transformation matrix of the image capture unit and the display unit 11.

To allow user to manually operate the human machine interface 121, the hand image 133 and the hand image 134 preferably contain the image of user's palm 20 and arm 21, as shown in FIG. 3. The image analysis unit 14 is capable of analyzing the hand image 133 to obtain arm image 1411 and palm image 1421, and analyzing the hand image 134 to obtain an arm image 1412 and a palm image 1422. Because the first image capture unit 131 and the second image capture unit 132 have been calibrated, the coordinate calculation unit 15 can, according to the arm image 1411, the arm image 1412, the intrinsic parameters 1311, the intrinsic parameters 1321, extrinsic parameters 1312 and extrinsic parameters 1322, calculate arm feature points 151, as shown in FIG. 3. In implementation, the coordinate calculation unit 15 searches at least two arm image feature appearing in both arm image 1411 and arm image 1412, and calculates the arm feature points 151 by a triangle position algorithm according to these arm image features.

The coordinate calculation unit 15 then calculates an arm extension line 152 formed by the arm feature points 151. The data processing unit 12 determines, according to size of the first object 181 and the second object 182, the depth parameter 191 and the depth parameter 192, whether the arm extension line 152 intersects the first object 181 or the second object 182.

The storage unit 17 sores multiple instructions 193, and each instruction 193 is mapped to a predefined hand posture. The hand posture recognition unit 16 is capable of recognizing a hand posture 161 according to the palm image 1421 and palm image 1422. The data processing unit 12 then determines whether the hand posture 161 matches any predefined hand posture mapped to one of instructions 193, if yes, the data processing unit 12 performs the instruction 193 mapped to the hand posture 161. Preferably, instructions 193 can comprise a selecting instruction, a grab instruction and a release instruction which are respectively mapped to a pointing posture, a grab posture and release posture. While the hand posture is recognized as a pointing posture by the hand posture recognition unit 16, it indicates that user wants to select the first object 181 or the second object 182, so the data processing unit 12 sets the object intersected with the arm extension line 152 as a selected object. Preferably, the selected object is highlighted on the human machine interface 121. As shown in FIG. 3, the object 182 is the selected object. If it is found that the arm extension line 152 intersects with multiple objects, the data processing unit 12 calculates an arm movement 153 according to these arm feature points 151, and then determines one of the intersected objects as the selected object according to the arm movement 153 and the depth parameters of the intersected objects. For example, if the arm movement 153 indicates that the arm 21 moves toward the display unit 11, the data processing unit 12 then determines the object having larger depth parameter as the selected object. Preferably, the data processing unit 12 can calculates an arm length formed by these arm feature points 151, and then calculates an object display depth corresponding to the arm movement 153 according to the ratio of the arm length and the aim movement 153, and determines the selected object according to the object display depth. Therefore, the effect caused by variance of users' arm lengths can be prevented.

After the selected object is determined and the hand posture 161 is recognized as a grab posture, the data processing unit 12 performs a grab instruction to set the selected object into a grabbed status and moves the selected object according to the arm movement 153. After the selected object is in the grabbed status and the hand posture 161 is recognized as a release posture, the data processing unit 12 performs a release instruction to erase the grabbed status of the selected object. Therefore, user can operate and move the object of the human machine interface by manually using his/her arm, palm and three hand posture. Preferably, user can predefine hand posture for other instruction. For example, while the selected object is in the grabbed status, user can hold a specific posture to activate the selected object or to delete the selected object.

Figure 4:
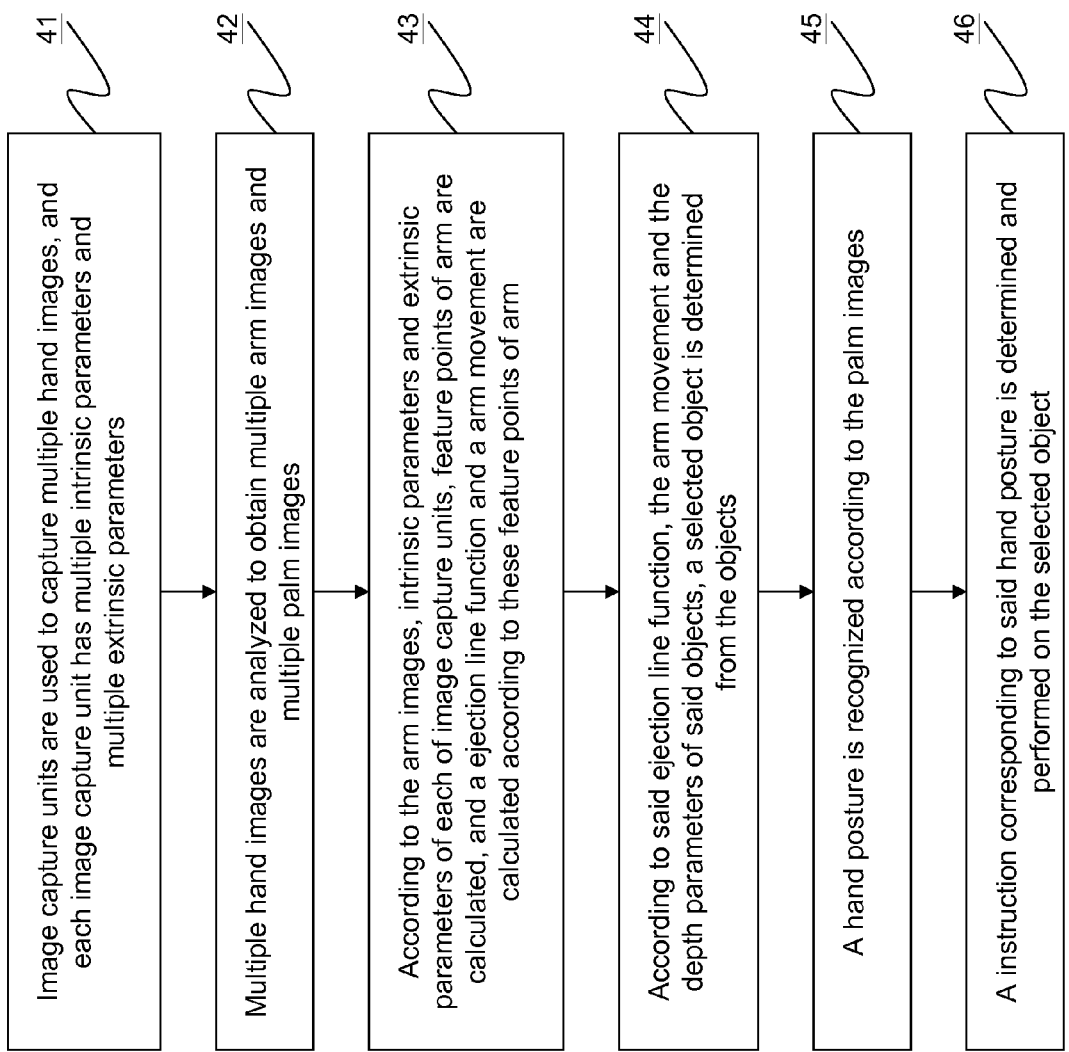
FIG. 4 illustrates a first exemplary flow chart of the method of operating a manual human machine interface in accordance with the present invention.

FIG. 4 illustrates a first exemplary flow chart of the method of operating a manual human machine interface in accordance with the present invention. This method is applied for the manual human machine interface with multiple objects, and each object contains a depth parameter. The manual human machine interface is shown on a display unit. The method comprises following steps. In step 41, multiple image capture units are used to capture multiple hand images, and each image capture unit has multiple intrinsic parameters and multiple extrinsic parameters. Preferably, intrinsic parameters and extrinsic parameters are generated by calibrating these image capture units, and used for transformation between the pixel position in the captured image and the coordinate of the display unit. In step 42, multiple hand images are analyzed to obtain multiple arm images and multiple palm images. In step 43, arm feature points are calculated according to arm images, and intrinsic parameters and extrinsic parameters of each of image capture units, and an arm extension line formed by these arm feature points are calculated, and an arm movement is calculated according to these arm feature points.

In step 44, according to the arm extension line, the arm movement and the depth parameters of objects, a selected object is determined from these objects. In step 45, a hand posture is recognized according to the palm images. In step 46, an instruction corresponding to the hand posture is determined and performed on the selected object. For example, a pointing posture is mapped to a selecting instruction, and used to select an object; a grab posture is mapped to a grab instruction, and used to set a selected object into a grabbed status; a release posture is mapped to a release instruction, and used to erase the grabbed status of the selected object.

Figure 5:
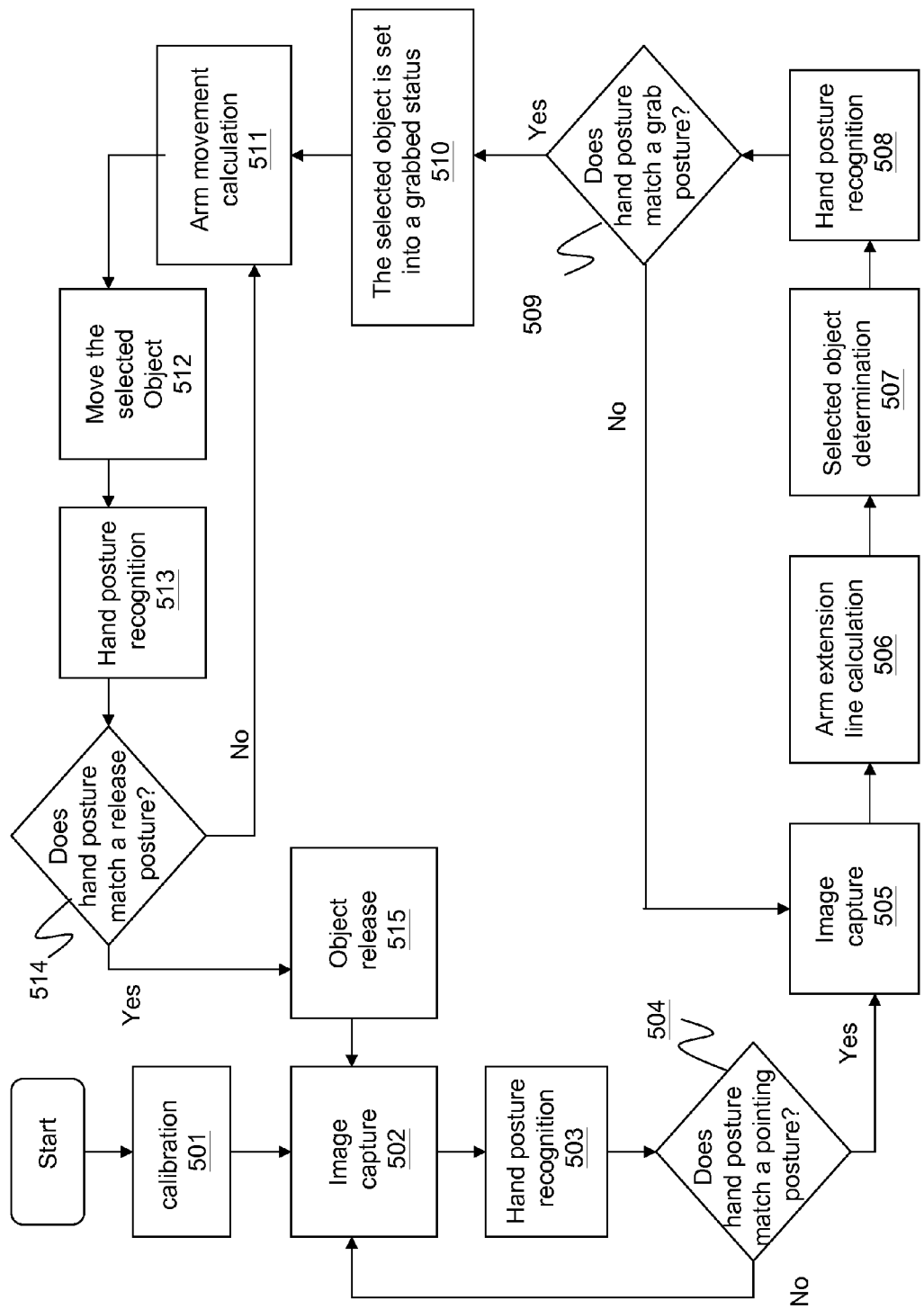
FIG. 5 illustrates a second exemplary flow chart of the method of operating a manual human machine interface in accordance with the present invention.

FIG. 5 illustrates a second exemplary flow chart of the method of operating a manual human machine interface in accordance with the present invention. In step 501, two image capture units respectively located on top-left corner and top-right corner of a display unit are calibrated to obtain intrinsic parameters and extrinsic parameters of two image capture units. In step 502, two image capture units are used to capture hand images of which contents contain the images of user's arm and palm. In step 503, palm images are extracted from the captured images, and a hand posture is recognized according to these palm images. In step 504, it is determined whether the hand posture is a pointing posture. If yes, step 505 is then performed; otherwise the step 502 is performed. In step 505, these two image capture unit are used to capture hand images. In step 506, arm images are extracted from the captured images, and arm feature points are obtained according to the arm images, and an arm movement and an arm extension line formed by these arm feature points are calculated. In step 507, it is determined whether the object shown on the human machine interface intersects with the arm extension line. AS shown in FIG. 3, the object intersected with the arm extension line is defined as a selected object. If there are multiple objects intersected with the arm extension line, the selected object is determined according to the arm movement.

In step 508, palm images are extracted from the captured hand images, and a hand posture is recognized according to the palm images. In step 509, it is determined whether the hand posture matches a grab posture. If the hand posture matches a grab posture, the selected object is set into a grabbed status in step 510. In step 511, two image capture units are used to capture hand images, and arm images are extracted from the captured hand images, and arm feature points are obtained according to the arm images, and an arm movement is calculated according to these arm feature points. In step 512, the selected object is moved according to the arm movement. In step 513, palm images are extracted form the captured hand images and a hand posture corresponding to these palm images is recognized. In step 514, it is determined whether this hand posture matches a release posture. If this hand posture matches the release posture, in step 515 the grabbed status of the selected object is erased and the step 502 is then performed. If this hand posture does not match the release posture, the step 511 is performed.

Preferably, the above-mentioned display unit can be a two dimensional displayer or a three dimensional displayer; and above-mentioned image capture unit can be a CCD camera, CMOS camera or a webcam.

Thus, specific embodiments and applications of manual human machine interface operation system and method thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:
1. A manual human machine interface operation system, comprising:
 a display unit;
 a data processing unit, generating a human machine interface with multiple objects, and each of said objects con- taining a depth parameter, and said data processing unit controlling said display unit to display said human machine interface;

multiple image capture units capturing multiple hand images and each of said image capture units having multiple intrinsic parameters and multiple extrinsic parameters;

an image analysis unit, analyzing said multiple hand images to obtain multiple arm images and multiple palm images;

a coordinate calculation unit, according to said arm images and intrinsic parameters and extrinsic parameters of each of image said capture units, calculating arm feature points, and calculating an arm extension line and an arm movement according to said arm feature points; and a hand posture recognition unit, recognizing a hand posture according to said palm images;

wherein said data processing unit is operable to, according to said arm extension line, said arm movement and said depth parameter of each of said objects, determine a selected object from said objects, and determine an instruction corresponding to said hand posture, and perform said instruction on said selected object;

wherein said data processing unit calculates an arm length according to said arm feature points, and determines an object display depth according to a ratio of said length and said arm movement, and determines said selected object according to said object display depth.

2. The manual human machine interface operation system of claim 1, wherein said data processing unit performs a selecting instruction while said hand posture is recognized as a pointing posture by said hand posture recognition unit.

3. The manual human machine interface operation system of claim 1, wherein said data processing unit performs a grab instruction to set said selected object into a grabbed status and move said selected object according to said arm movement while said hand posture is recognized as a grab posture by said hand posture recognition unit.

4. The manual human machine interface operation system of claim 3, wherein said data processing unit performs a release instruction to erase said grabbed status of said selected object while said hand posture is recognized as a release posture by said hand posture recognition unit.

5. The manual human machine interface operation system of claim 1, wherein said selected object is highlighted on said human machine interface.

6. A method of operating a manual human machine interface with multiple objects, and each of said objects containing a depth parameter, said method comprising steps of:

displaying said objects on a display unit;

using multiple image capture units to capture multiple hand images, and each of said image capture units having multiple intrinsic parameters and multiple extrinsic parameters;

analyzing said multiple hand images to obtain multiple arm images and multiple palm images;

according to said arm images and intrinsic parameters and extrinsic parameters of each of said image capture units, calculating arm feature points, and calculating an arm extension line and an arm movement according to said arm feature points;

according to said arm extension line, said arm movement and said depth parameter of each of said objects;

calculating an arm length according to said arm feature points, and determining an object display depth according to a ratio of said arm length and said arm movement; and determining a selected object according to said object display depth;

recognizing a hand posture according to said palm images; and determining an instruction corresponding to said hand posture and performing said instruction on said selected object displayed on the display unit.

7. The method of claim 6, further comprising a step of: performing a selecting instruction while said hand posture is recognized as a pointing posture.

8. The method of claim 6, further comprising a step of: performing a grab instruction to set said selected object into a grabbed status and move said selected object according to said arm movement while said hand posture is recognized as a grab posture.

9. The method of claim 8, further comprising a step of: performing a release instruction to erase said grabbed status of said selected object while said hand posture is recognized as a release posture.

10. The method of claim 6, further comprising a step of: highlighting said selected object on said human machine interface.

* * * * *